United States Patent

Schneider

[15] 3,642,502
[45] Feb. 15, 1972

[54] BLEED RESISTANT INK
[72] Inventor: Donald J. Schneider, Green Bay, Wis.
[73] Assignee: Fort Howard Paper Company
[22] Filed: Apr. 25, 1969
[21] Appl. No.: 819,420

[52] U.S. Cl. ..................................106/23, 106/27, 260/18, 260/37
[51] Int. Cl. ...................................C09d 11/00, C09d 11/06
[58] Field of Search ....................106/20, 22, 27, 23; 260/39, 260/18

[56] References Cited

UNITED STATES PATENTS 2,705,223 3/1955 Renfrew et al. ...........................260/18
3,280,054 10/1966 Gotze et al. ...............................260/18

OTHER PUBLICATIONS

App, Printing Ink Technology Leonard Hill [books] Limited, London, 1958, TP949A6, page 389 relied on Primary Examiner—Joan B. Evans
Attorney—Bair, Freeman & Molinare

[57] ABSTRACT

A bleed resistant ink for printing on paper products which is likely to come into contact with common solvents such as water, alcohol, etc. The bleed resistant ink comprises a coloring material, polyamide epichlorohydrin, talc and a solvent.

6 Claims, No Drawings

BLEED RESISTANT INK

BACKGROUND OF THE INVENTION

The present invention relates to bleed resistant ink, and more particularly, it relates to bleed resistant ink which can be used for printing on fibrous cellulosic materials such as paper.

Most flexographic alcohols, used today contain dyestuffs in solvent systems such as alchols, esters or ketones. One advantage of such inks is that they can be readily mixed with water for dilution. However, prints made from these inks generally will not withstand exposure to water or to the solvents which were used in their formation. The ink can come off the paper base when exposed to a solvent or to water. Moreover, some inks considered satisfactory when tested under static conditions for bleed resistance were found not able to withstand rubbing or other abrasive action when wetted by solvents.

In the manufacture of certain paper products, such as towels and wipers, it is advantageous to print a design on these paper products. The design makes the paper products more attractive and enhances their saleability. However, these paper products are frequently used under conditions when they are exposed to water or other solvents. For example, the windshield towels used in service stations to clean the windshields of automobiles must be designed for use with water or other solvents. As indicated above, the normal inks available today which could be used to print design on paper products by a flexographic printing process cannot withstand the action of water or other solvents, especially with rubbing.

It is, therefore, an object of the present invention to provide a novel ink which can be applied to paper or other cellulosic materials and which is resistant to the action of normal solvents such as water, alcohol or detergent systems.

It is another object of the present invention to provide a novel ink system which is economical to use and easy to apply.

It is a further object of the invention to provide a novel ink system which has good flow characteristics for printing purposes.

These and other objects of the invention can be gathered from the following description.

SUMMARY OF THE INVENTION

In accordance with the present invention, I provide a novel ink system which contains a coloring material or dyestuff, polyamide epichlorohydrin, talc, an alkali and a solvent.

It has been found that a printing ink made as indicated above has good flow characteristics, can be easily applied to paper products, is economical to use, and provides a print which is resistant to the solvent action of most common solvents such as water, alcohol and detergent systems.

DESCRIPTION OF THE PREFERRED EMBODIMENTS

As indicated above, the bleed resistant ink of the present invention is made of a coloring material or dyestuff, polyamide epichlorohydrin, talc, an alkali and a solvent.

The particular coloring material or dyestuff and the amount to be used depend on the particular application and results desired. Examples of the dyestuffs which I have found to be suitable for use in the ink of the present invention are Chloramine Blue, Chloramine Green, Fastusol Yellow, Congo Red and Phenol Sky Blue, etc. The amount of the dyestuff to be used can be varied within an extremely wide range, depending on the particular dyestuff used and the strength of the print or impression desired.

The polyamide epichlorohydrin resin is believed to be the material which imparts the bleed resistant property to the ink of the present invention. Polyamide epichlorohydrin, urea formaldehyde and melamine formaldehyde are commonly used to impart wet strength to paper products, Surprisingly, I have found that polyamide epichlorohydrin, when used in the ink of the present composition, imparts bleed resistance to the ink whereas urea formaldehyde and melamine formaldehyde are not suitable for this purpose. The urea formaldehyde resin does not impart sufficient bleed resistance to the ink while melamine formaldehyde is not compatible with the ink and causes a gummy mass to be formed.

The amount of polyamide epichlorohydrin which can be used in the ink of the present invention can also be varied widely. Generally, I have found that between about 2 percent to about 20–25 percent by weight of the polyamide epichlorohydrin is suitable. More particularly, I prefer to use an amount of the polyamide epichlorohydrin which is equivalent to about 5 to 15 percent of the ink by weight.

The polyamide epichlorohydrin resin used in the ink of the invention may be prepared in accordance with the disclosure of Keim U.S. Pat. No. 2,926,116, wherein said resin is disclosed as being an uncured thermosetting cationic resin comprising a water-soluble polymeric reaction product of epichlorohydrin and a polyamide derived from a polyakylene polyamine and a saturated aliphatic dibasic carboxylic acid containing from about 3 to 10 carbon atoms. I have found that a product of the Hercules Powder Company, under the tradename Kymene 709, containing about 25 percent solids, is a suitable source of the polyamide epichlorohydrin. If Kymene 709 is used as the polyamide epichlorohydrin, the maximum concentration of the resin in the final ink composition obtainable is slightly less than 22 percent.

The presence of talc is also critical in the ink of the invention. The presence of the resin in the ink causes the ink to be tacky and results in poor printability of the ink. In addition, the resin causes the ink to spatter on the flexographic press rollers which is, of course, extremely undesirable. The presence of talc lends body to the ink and permits it to be easily spread and printed. The amount of talc to be used can be varied within a wide range, depending in part on the amount of resin employed in the ink. Generally, I have found between about 1 to 25 percent by weight of talc in the ink is suitable. More particularly, I prefer to use about 5 to 10 percent talc in the ink.

The incorporation of an alkali in the ink of the present invention is desirable due to the low pH value of the resin. As indicated, in U.S. Pat. No. 2,926,116 polyamide epichlorohydrin is prepared under acidic conditions. The low pH value of the resin imparts acidity to the ink which is deleterious to the printing equipment. Moreover, it is believed that a higher pH value for the ink promotes a faster cure of the resin in the ink.

As the alkaline material to be used in the ink of the present invention, there may be mentioned sodium hydroxide and sodium carbonate. Other alkaline materials which can be used for the purpose are known to those skilled in this art. I prefer to use an amount of the alkali to result in a pH value for the ink between about 6.0 and 7.0. More particularly, I prefer to use an amount of the alkali to obtain a pH value of the ink between about 6.5 and 7.0. Somewhat higher pH values can be tolerated by the ink, but they are unnecessary.

The following examples will further describe and illustrate the invention.

EXAMPLE 1

1 gram of Chloramine Blue was added to 5 grams of hot water (125°–140° F.) to form a paste. 45 grams of water at room temperature were then added to the paste and thoroughly mixed. 54 grams of Kymene 709, containing about 25 percent solids, were than added with constant stirring. 10 grams of talc were then added with additional stirring. The mixture was then agitated for about 10 minutes following the addition of talc. Finally, the pH of the mixture was adjusted with the addition of sodium hydroxide to provide a final pH value of nearly 7.

The ink prepared above was used in flexographic printing of the windshield paper towels. Paper towels so printed were found to bleed resistant, i.e., the dyestuff did not come off the paper when the towels were used to clean automobile windshields wetted with water, solutions of alcohol and various detergent solutions.

The ink as prepared above is significantly less expensive than comparable aniline ink and it possesses better printability. In general, I have found that the ink of the invention permits the printing presses to be run 400 to 500 feet per minute faster than with comparable aniline ink.

EXAMPLE 2

The procedure of Example 1 was repeated except that 1 gram of Chloramine Green was used in place of Chloramine Blue. The resultant ink was then used to print onto kitchen towels in the laboratory. The printing on the towels was found to be resistant to fats and oils commonly encountered in cooking. Fat from fried bacon and hydrogenated oil (Crisco) was spread on the printed towels and the printed design remained fast on the towel and did not come off.

EXAMPLE 3

The procedure of Example 1 was repeated for a bleed resistant ink composition containing: 1 gram of Congo Red; 10 grams of talc; 50 grams of water; 54 grams of Kymene 709; and 0.9 gram of sodium hydroxide (solid). The pH of the ink was about 7.0. Paper towels printed with the ink in the laboratory were found to be resistant to bleeding by common solvents such as water and detergent solutions.

EXAMPLE 4

The procedure of Example 3 was repeated except that 1 gram of Fastusol Yellow was used in place of the Congo Red. Only 0.8 gram of sodium hydroxide was used in preparing this ink. The pH of the ink was found to be about 6.5. Paper towels printed with the ink in the laboratory were found to be similarly resistant to common solvents.

EXAMPLE 5

A bleed resistant ink according to the present invention and containing a relatively large amount of polyamide epichlorohydrin was prepared by mixing 1 gram of Chloramine Blue, 10 grams of talc, 107.9 grams of Kymene 709, and sodium hydroxide to adjust the pH of the ink to about 7.0. This ink was found to be somewhat more difficult to apply to paper towels but once applied, it gives the paper towels excellent bleed resistance.

EXAMPLE 6

Another bleed resistant ink was prepared by mixing 1 gram of Chloramine Blue, 10 grams of talc, 92 grams of water, 8.635 grams of Kymene 709 (about 8 ml.) and sodium hydroxide to adjust the pH to about 7.0. When printed onto paper towels in the laboratory, this ink was also found to impart bleed resistance to the printed towels.

The invention has been described in detail with reference to particular and preferred embodiments thereof, but it will be understood that variations and modifications can be made within the spirit and scope of the invention as described hereinabove and as defined in the appended claims.

I claim:

1. A bleed resistant ink composition comprising a coloring material, about 2-percent by weight of an uncured thermosetting cationic resin comprising a water soluble polymeric reaction product of epichlorohydrin and a polyamide derived from a polyalkylene polyamine and a saturated aliphatic dibasic carboxylic acid containing from about 3 to 10 carbon atoms, about 1-25 percent by weight of talc and a solvent.

2. A bleed resistant ink composition according to claim 1 further comprising an alkali, and wherein said solvent is water.

3. A bleed resistant ink composition according to claim 2 wherein said alkali is sodium hydroxide or sodium carbonate.

4. A bleed resistant ink composition according to claim 2 wherein said alkali is present in an amount sufficient to provide a pH value for said ink composition between about 6.5 to 7.0.

5. A bleed resistant ink composition according to claim 2 wherein said polyamide epichlorohydrin is present in an amount between about 5 to 15 percent by weight and said talc is present in an amount between about 5 to 10 percent by weight.

6. A bleed resistant ink composition according to claim 2 wherein said polyamide epichlorohydrin is present in an amount about 11.5 percent by weight, said talc is present in an amount about 8.5 percent by weight, said dyestuff is present in an amount about 1 percent by weight, said alkali is present in an amount to result in a pH value for said ink composition of about 7, the balance being water.

* * * * *

UNITED STATES PATENT OFFICE
CERTIFICATE OF CORRECTION

Patent No. 3,642,502  Dated February 15, 1972

Inventor(s) Donald J. Schneider

It is certified that error appears in the above-identified patent and that said Letters Patent are hereby corrected as shown below:

In Column 1, line 8, "flexographic alcohols" should be changed to read --flexographic inks--.

In Column 1, line 9, correct the spelling of "alchols" to read --alcohols--.

In Column 4, line 17, Claim 1, change "2 - percent" to read --2 - 25 percent--.

Signed and sealed this 3rd day of October 1972.

(SEAL)
Attest:

EDWARD M. FLETCHER, JR.
Attesting Officer

ROBERT GOTTSCHALK
Commissioner of Patents